US012543285B2

United States Patent
Yang et al.

(10) Patent No.: US 12,543,285 B2
(45) Date of Patent: Feb. 3, 2026

(54) CONNECTOR, HOST AND DATA PROCESSING EQUIPMENT

(71) Applicant: Fulian Precision Electronics (Tianjin) Co., LTD., Tianjin (CN)

(72) Inventors: Bin-Bin Yang, Tianjin (CN); Fang-Xing Yang, Tianjin (CN); Xing-Chuan Li, Tianjin (CN); Rui-Hao Xiao, Tianjin (CN); Liang Gao, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 145 days.

(21) Appl. No.: 18/518,510

(22) Filed: Nov. 23, 2023

(65) Prior Publication Data

US 2024/0381562 A1    Nov. 14, 2024

(30) Foreign Application Priority Data

May 12, 2023  (CN) .......................... 202321152252.7

(51) Int. Cl.
  *H05K 7/14*   (2006.01)
  *G06F 1/18*   (2006.01)
  *H05K 5/02*   (2006.01)

(52) U.S. Cl.
  CPC .......... *H05K 7/1487* (2013.01); *G06F 1/187* (2013.01); *H05K 5/0221* (2013.01); *H05K 7/1401* (2013.01); *G06F 1/183* (2013.01); *H05K 5/023* (2013.01); *H05K 7/1411* (2013.01); *H05K 7/1489* (2013.01)

(58) Field of Classification Search
  CPC .. H05K 7/1489; H05K 7/1487; H05K 5/1401; H05K 5/1411; G06F 1/183; G06F 1/187
  See application file for complete search history.

(56) References Cited

U.S. PATENT DOCUMENTS

| | | | | |
|---|---|---|---|---|
| 6,373,695 | B1* | 4/2002 | Cheng | G06F 1/184 |
| 10,368,460 | B1* | 7/2019 | Yang | H05K 7/1411 |
| 11,538,504 | B2* | 12/2022 | Gao | G06F 1/187 |
| 2013/0162131 | A1* | 6/2013 | Zhou | G06F 1/187 |
| | | | | 312/304 |
| 2013/0168337 | A1* | 7/2013 | Zhou | G06F 1/183 |
| | | | | 248/221.11 |
| 2014/0355209 | A1* | 12/2014 | Yin | H05K 7/1489 |
| | | | | 361/679.58 |
| 2019/0174648 | A1* | 6/2019 | Lin | H05K 7/1489 |
| 2021/0274667 | A1* | 9/2021 | Lin | H05K 7/1401 |
| 2023/0309252 | A1* | 9/2023 | Chiu | H05K 7/1425 |

FOREIGN PATENT DOCUMENTS

CN       115543039 A * 12/2022 ............... G06F 1/20

* cited by examiner

*Primary Examiner* — Kimberley S Wright
(74) *Attorney, Agent, or Firm* — ScienBiziP, P.C.

(57) ABSTRACT

A connector for installing a device in a host includes a main body for connecting the device, a connecting portion retractably connected to the main body, and a pull ring connected to the connecting portion. The pull ring is configured to be connected to a lifting component. The connecting portion is configured to partially protrude from the main body to connect to a cabinet of the host when the pull ring is not pulled by the lifting component, and retract into the main body to separate from the cabinet of the host when the pull ring is pulled by the lifting component. A host having the connector and a data processing equipment having the host are also provided.

14 Claims, 7 Drawing Sheets

CONNECTOR, HOST AND DATA PROCESSING EQUIPMENT

FIELD

The subject matter herein generally relates to a connector, a host having the connector, and a data processing equipment having the host.

BACKGROUND

The device is usually fixed in the housing by screws. Tools are required to lock the screws during assembly and remove the screws before or during the maintenance, resulting in low efficiency of assembly and maintenance, which is not conducive to production.

Therefore, there is room for improvement within the art.

BRIEF DESCRIPTION OF THE DRAWINGS

Implementations of the present disclosure will now be described, by way of embodiments, with reference to the attached figures.

DETAILED DESCRIPTION

Figure 1:
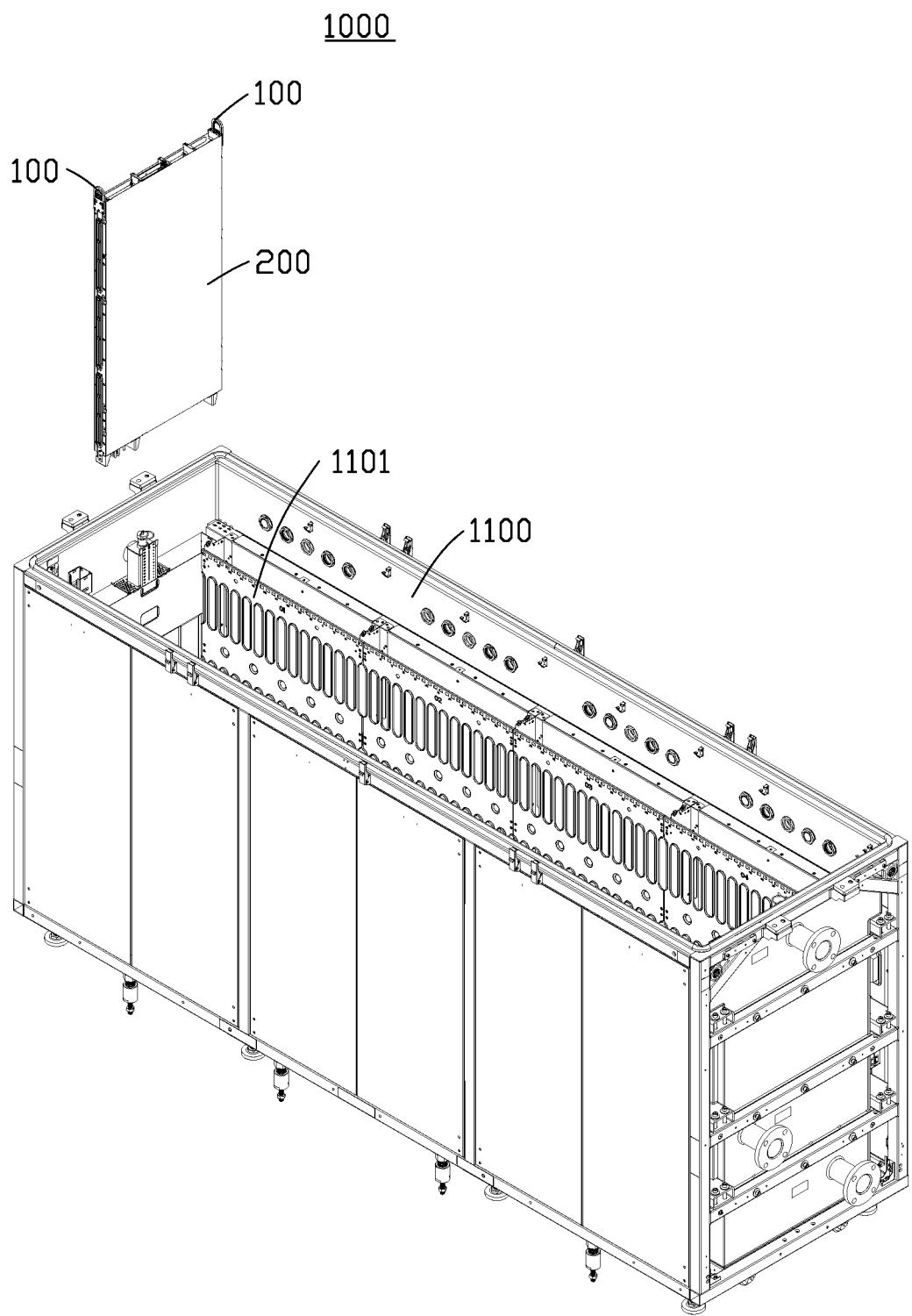
FIG. 1 is a schematic diagram illustrating a device installed in a host through a connector according to an embodiment of the present disclosure.
Figure 2:
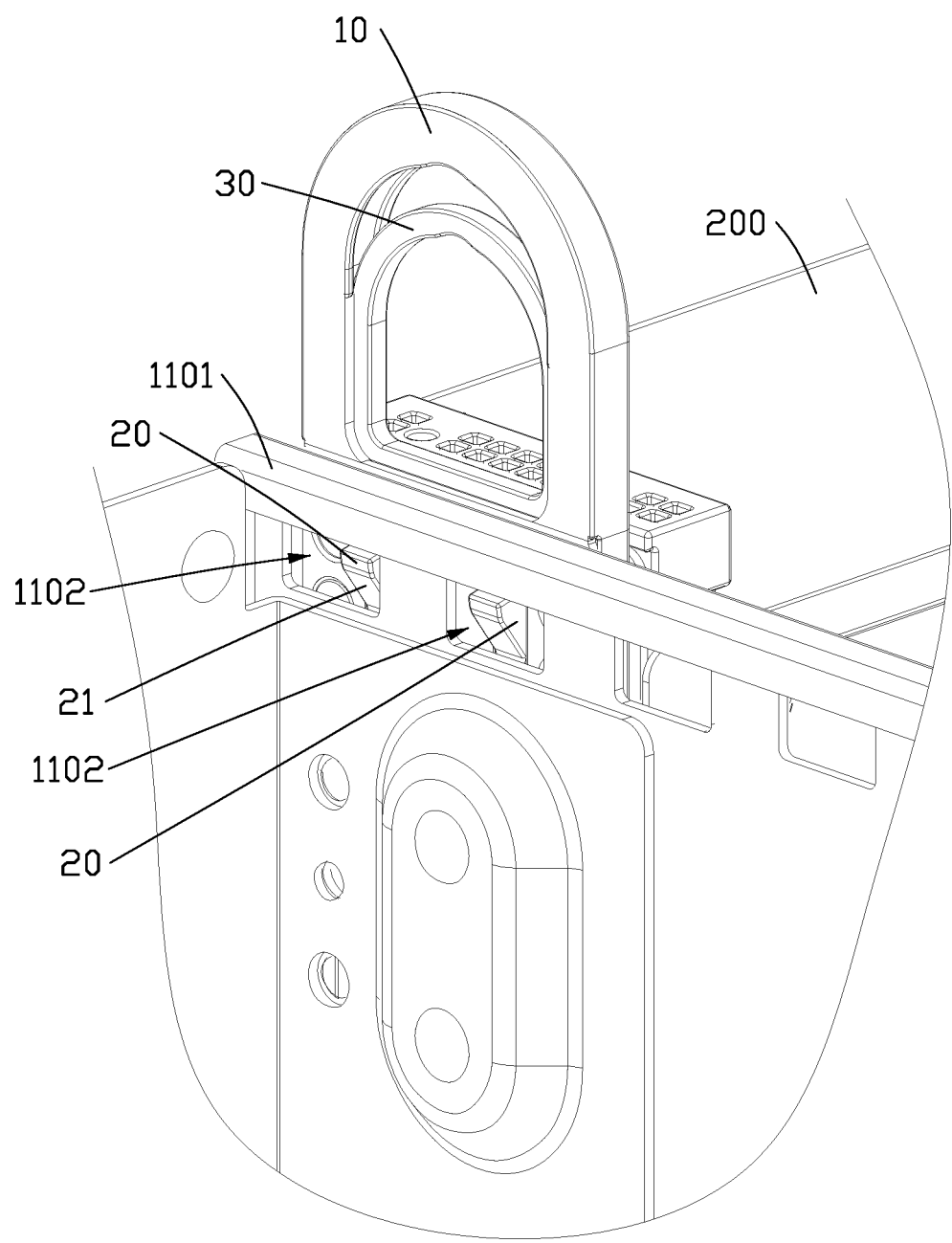
FIG. 2 is a partially enlarged view illustrating a device installed in a host through a connector according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

FIG. 1 illustrates an embodiment of a connector 100 applied to a host 1000. The connector 100 is used to connect a device 200 and a cabinet 1100 of the host 1000 to install the device 200 in the host 1000. Referring to FIGS. 1, 2, 3, and 4, the connector 100 includes a main body 10, a connecting portion 20, and a pull ring 30. The main body 10 is used to be fixed with the device 200. The connecting portion 20 is retractably connected to the main body 10. The pull ring 30 is connected to the connecting portion 20 and used to be connected to a lifting component 110. The connecting portion 20 is configured to partially protrude from the main body 10 to connect to the cabinet 1100 of the host 1000 when the pull ring 30 is not pulled by the lifting component 110, and to retract into the main body 10 to separate from the cabinet 1100 of the host 1000 when the pull ring 30 is pulled by the lifting component 110. In the above connector 100 and the host 1000, the connecting portion 20 is retractably connected to the main body 10 and the pull ring 30 is connected to the connecting portion 20 to realize the installation and disassembly of the connector 100 and the cabinet 1100 of the host 1000, thereby realizing the installation and disassembly of the device 200 and the host 1000, which is beneficial to increasing a speed of installing and replacing the device 200, so that the efficiency can be improved.

Figure 3:
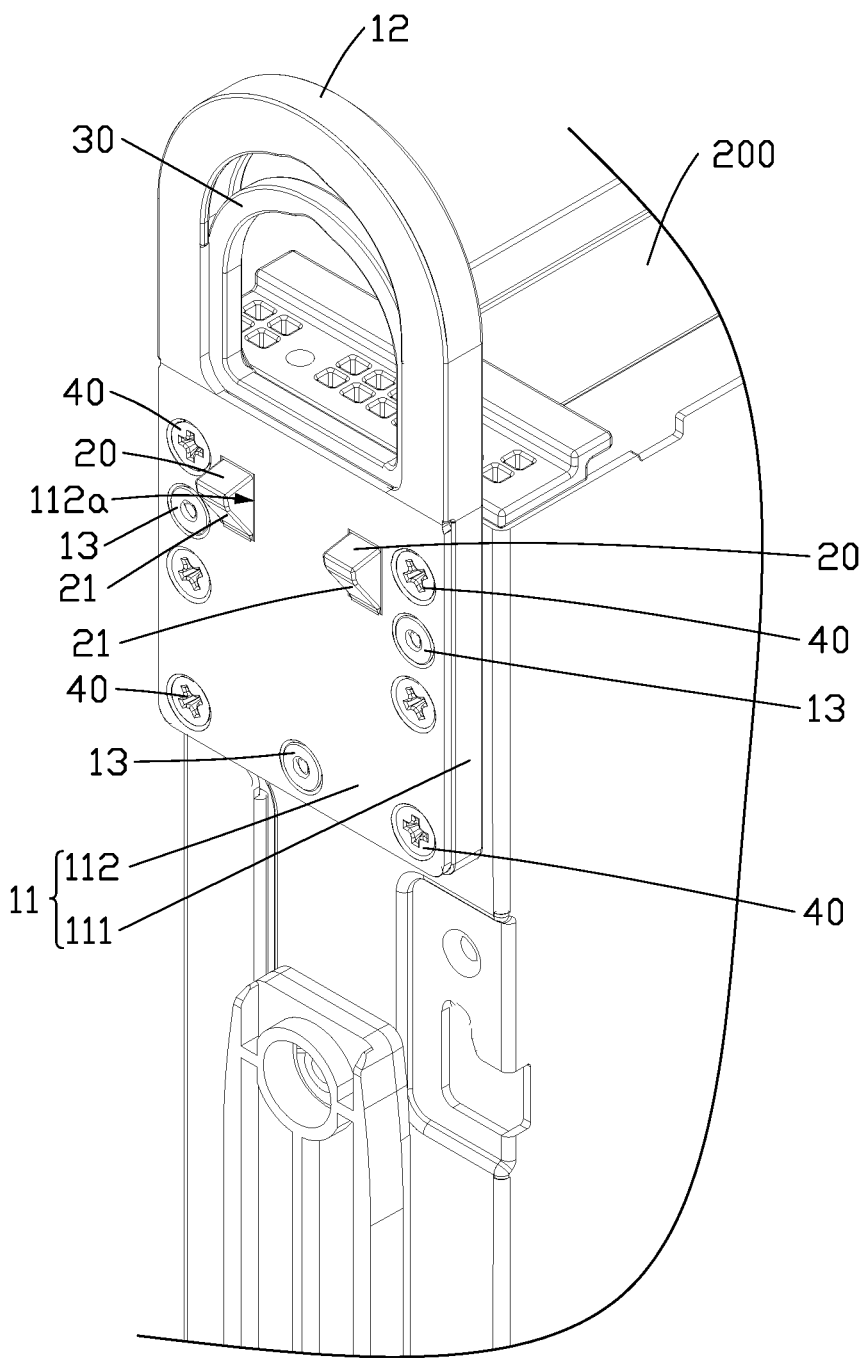
FIG. 3 is a partially enlarged view illustrating a connector fixed to a device according to an embodiment of the present disclosure.
Figure 4:
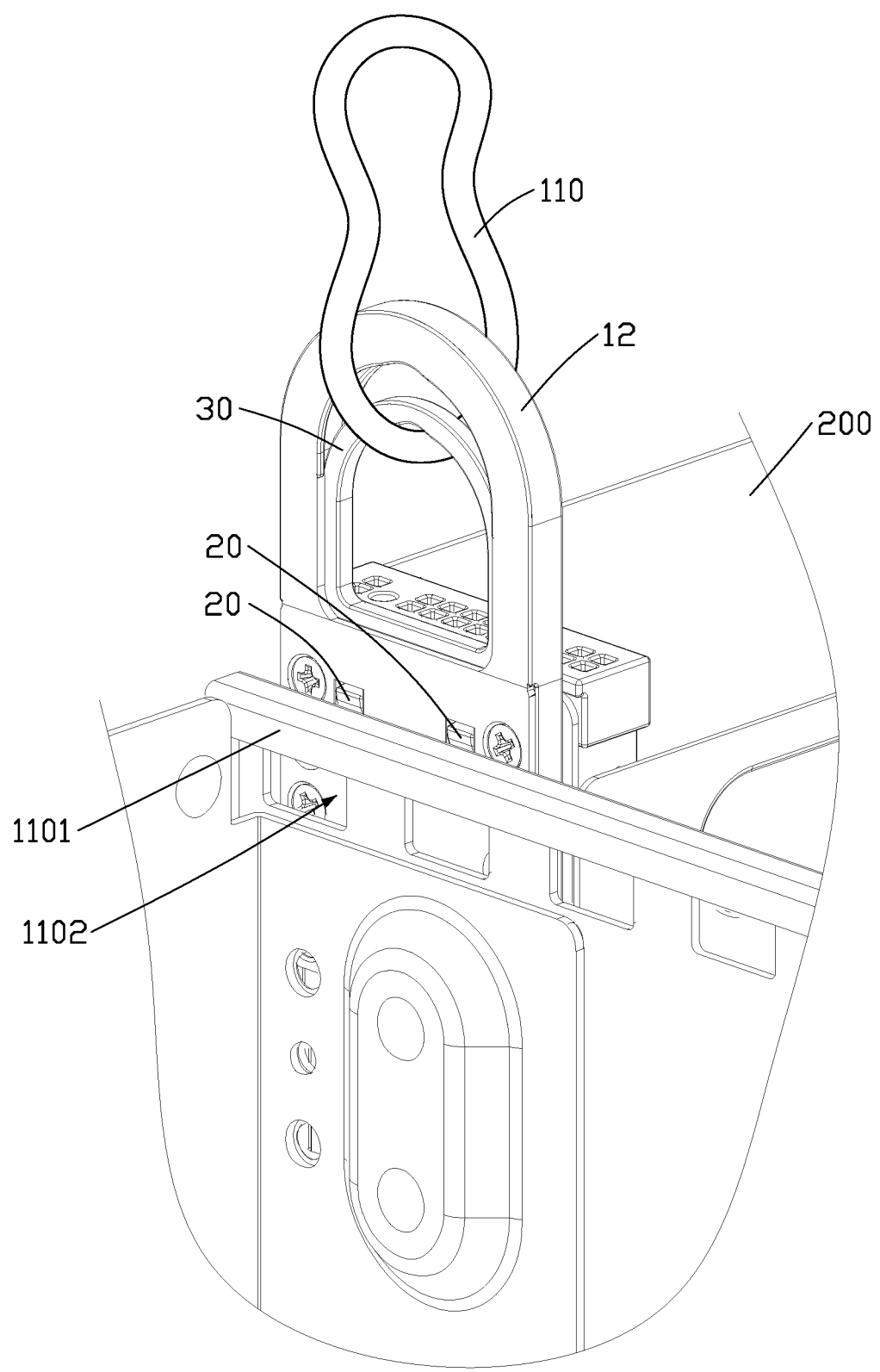
FIG. 4 is a schematic diagram illustrating a device installed in a host through a connector in another state according to an embodiment of the present disclosure.
Figure 5:
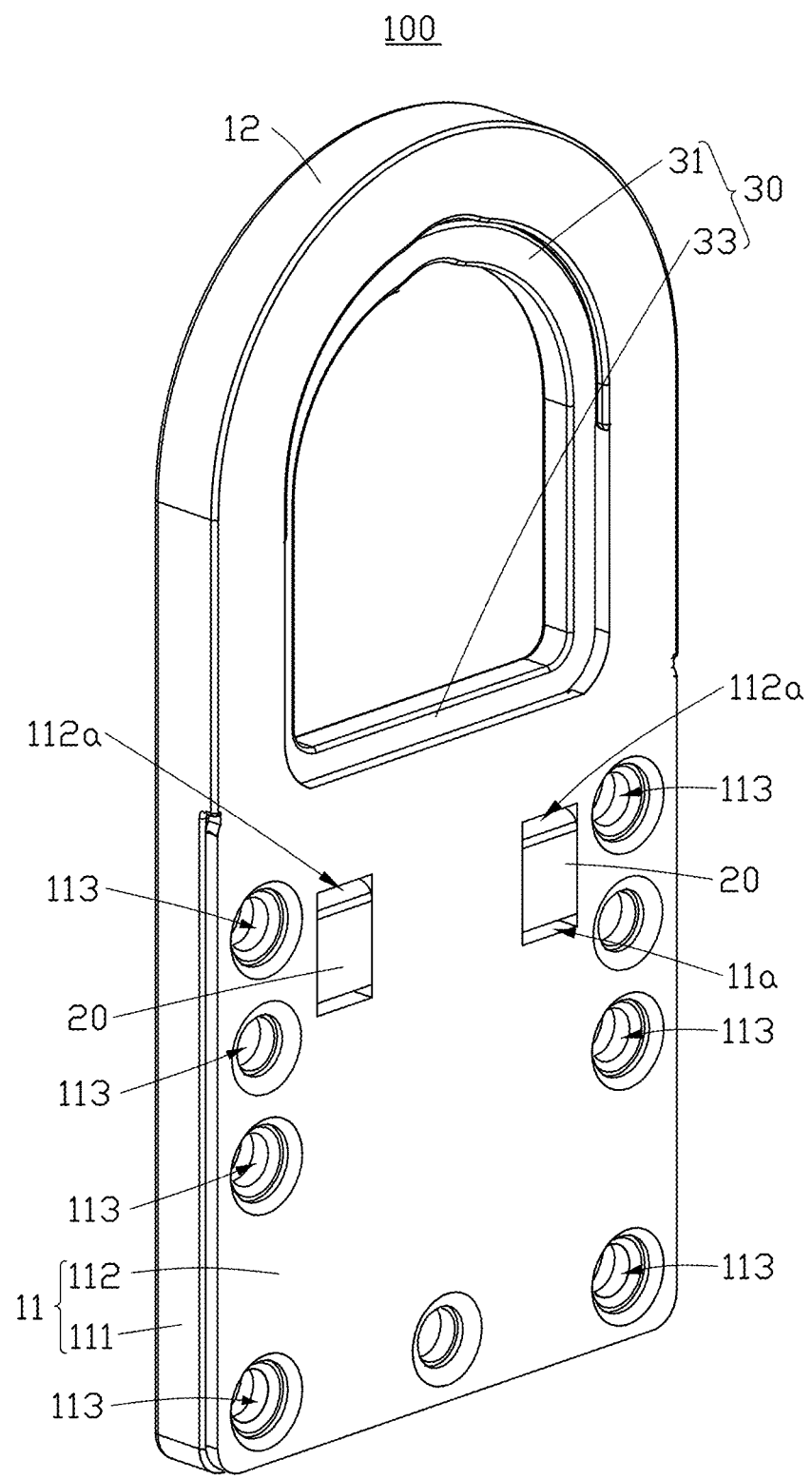
FIG. 5 is a schematic diagram illustrating a connector according to an embodiment of the present disclosure.
Figure 6:
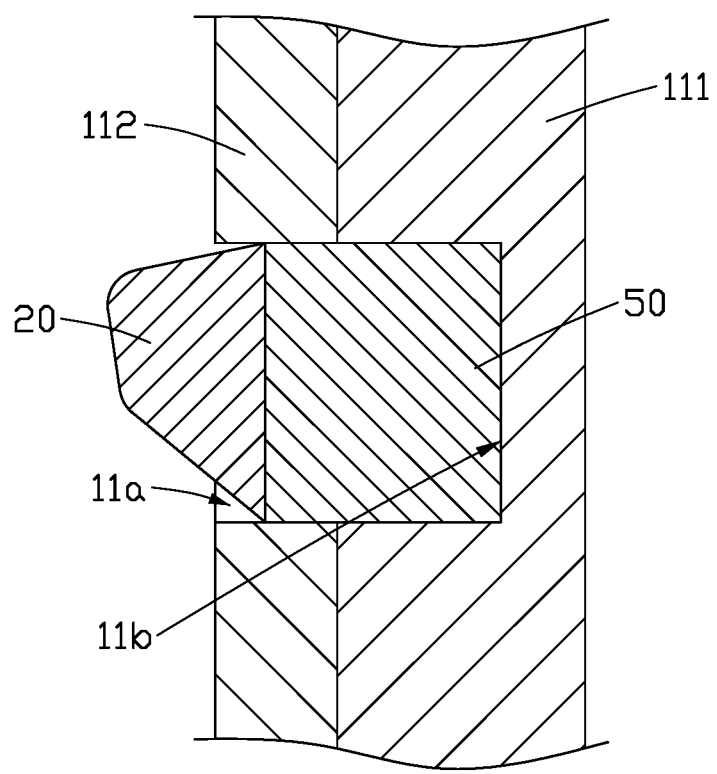
FIG. 6 is a partially enlarged cross-sectional view illustrating a connector according to an embodiment of the present disclosure.

Referring to FIGS. 3, 5, and 6, in at least one embodiment, the main body 10 may include a first portion 11 and a second portion 12 connected to the first portion 11. The first portion 11 is used to fix the device 200. The first portion 11 includes an inner surface 11b to define a receiving space 11a, a part of the connecting portion 20 is arranged in the receiving space 11a.

In at least one embodiment, the first portion 11 may include a receiving part 111 and a cover 112. The cover 112 is connected to the receiving part 111 to cooperate with each other to define the receiving space 11a. The cover 112 defines a through hole 112a communicating with the receiving space 11a. The connecting portion 20 is partially arranged in the through hole 112a and can protrude from the through hole 112a and retract into the through hole 112a. When the connecting portion 20 retracts into the through hole 112a, the entire connecting portion 20 does not protrude from a surface of the cover 112 facing away from the receiving part 111, so that the connector 100 can be easily separated from the cabinet 1100 of the host 1000.

In at least one embodiment, the main body 10 may further include a first fixing member 13, the first fixing member 13 penetrates the cover 112 and is connected to the receiving part 111. The cover 112 is fixed to the receiving part 111 through the first fixing member 13.

In at least one embodiment, the first portion 11 may further define a plurality of connecting holes 113. Each of the plurality of connecting holes 113 penetrates the cover 112 and the receiving part 111. The connector 100 may further include a plurality of second fixing members 40. Each of the plurality of second fixing members 40 partially penetrates one of the plurality of connecting holes 113 and is used to be fixed to the device 200, thereby improving a connection strength between the connector 100 and the device 200 and facilitate the hoisting the device 200.

In at least one embodiment, when the first portion 11 is fixed to the device 200, the second portion 12 protrudes from the device 200 to facilitate the connection with the lifting component 110. The second portion 12 may be in a shape of a ring, and the pull ring 30 is arranged in the second portion 12. When the lifting component 110 is connected to the pull ring 30 and pulls the pull ring 30, the pull ring 30 may abut against an inner wall of the second portion 12, so that the second portion 12 can withstand a part of a pulling force of the pull ring 30 during hoisting, which can reduce a risk of damage to the pull ring 30 during hoisting and is beneficial to prolonging the service life of the connector 100. Furthermore, the pull ring 30 abutting against the inner wall of the second portion 12 can stabilize the position of the pull ring 30 and improve the stability of the hoisting. The pull ring 30 includes a ring portion 31 for holding and an extension portion 33 connecting the ring portion 31 for connecting the connecting portion 20.

In at least one embodiment, the connecting portion 20 may include an inclined surface 21. When the device 200 is installed, the inclined surface 21 contacts the cabinet 1100 of the host 1000 and moves relative to the cabinet 1100 of the host 1000, at this time, the connecting portion 20 is pushed by the cabinet 1100 of the host 1000 to retract into the receiving space 11a. After the inclined surface 21 moves out of contact with the cabinet 1100 of the host 1000, the connecting portion 20 protrudes from the receiving space 11a and is connected to the cabinet 1100 of the host 1000.

In at least one embodiment, when the device 200 is installed, the pull ring 30 is connected to the lifting component 110, and when the gravity of the device 200 hoisted by the lifting component 110 is less than a force required by the pull ring 30 to pull the connecting portion 20 to retract into the receiving space 11a, the connecting portion 20 protrudes from the receiving space 11a. When the inclined surface 21 contacts the cabinet 1100 of the host 1000, the connecting portion 20 is pushed by the cabinet 1100 of the host 1000 to retract into the receiving space 11a. After the inclined surface 21 moves out of contact with the cabinet 1100 of the host 1000, the connecting portion 20 protrudes from the receiving space 11a and is connected to the cabinet 1100 of the host 1000. As a result, the device 200 is fixed to the host 1000.

In at least one embodiment, when the device 200 is installed, the pull ring 30 is connected to the lifting component 110, and when the gravity of the device 200 hoisted by the lifting component 110 is greater than the force required by the pull ring 30 to pull the connecting portion 20 to retract into the receiving space 11a, the connecting portion 20 retracts into the receiving space 11a. When the device 200 reaches a preset position in the cabinet 1100 of the host 1000, the connecting portion 20 protrudes from the receiving space 11a and is connected to the cabinet 1100 of the host 1000 after the lifting component 110 is released.

In at least one embodiment, when the device 200 is replaced, the device 200 needs to be pulled out from the cabinet 1100 of the host 1000. When a hoisting force of the lifting component 110 to hoist the device 200 is greater than the force required by the pull ring 30 to pull the connecting portion 20 to retract into the receiving space 11a, the connecting portion 20 retracts into the receiving space 11a and the connecting portion 20 is separated from the cabinet 110 of the host 1000, so that the lifting component 110 can hoist the device 200 and the connector 100 together for replacement.

In at least one embodiment, when the connector 100 is not connected to the lifting component 110, the device 200 and the host 1000 may be assembled and disassembled by pressing and releasing the connecting portion 20.

In at least one embodiment, an elastic member 50 may be arranged between the connecting portion 20 and the inner surface 11b of the first portion 11. The elastic member 50 is connected to the connecting portion 20 and the inner surface 11b of the first portion 11. The elastic member 50 is used to drive the connecting portion 12 to protrude from the cover 112 through an elastic force of the elastic member 50 so as to lock the cabinet 1100 of the host 1000 and the connecting portion 12 together. When the connecting portion 12 is forced to retract into the receiving space 11a, the elastic member 50 is compressed between the connecting portion 12 and the inner surface 11b of the first portion 11.

In the above connector 100, the connecting portion 20 is retractably connected to the main body 10 and the pull ring 30 is connected to the connecting portion 20 to realize the installation and disassembly of the connector 100 and the cabinet 1100 of the host 1000, thereby realizing the installation and disassembly of the device 200 and the host 1000, which is beneficial to increasing a speed of installing and replacing the device 200, so that the efficiency can be improved.

In at least one embodiment, the cabinet 1100 may include a resisting member 1101 and a fixing hole 1102. The fixing hole 1102 may be provided below the resisting member 1101. When the device 200 is installed in the cabinet 1100, the inclined surface 21 abuts against the resisting member 1101 and is pressed to retract into the receiving space 11a. When the connecting portion 20 is moved to the fixing hole 1102, the inclined surface 21 is not in contact with the resisting member 1101 and the elastic member 50 drives the connecting portion 20 to protrude from the receiving space 11a through the elastic force and the connecting portion 20 is arranged in the fixing hole 1102, thereby fixing the device 200 in the cabinet 1100 of the host 1000.

Figure 7:
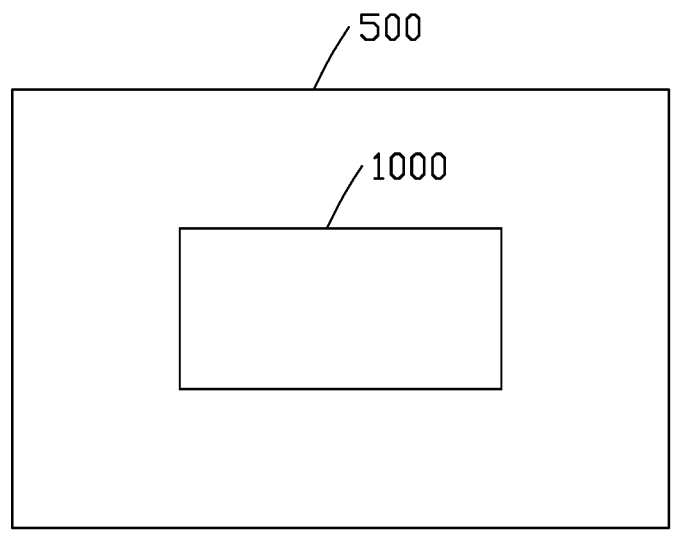
FIG. 7 is a schematic diagram illustrating a data processing equipment according to an embodiment of the present disclosure.

Referring to FIG. 7, the host 1000 may be applied in a data processing equipment 500 to perform data processing.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A connector for installing a device in a host, comprising:
    a main body for connecting the device;
    a connecting portion retractably connected to the main body; and
    a pull ring connected to the connecting portion,
    wherein the pull ring is configured to be connected to a lifting component, the connecting portion is configured to partially protrude from the main body to connect to a cabinet of the host when the pull ring is not pulled by the lifting component, and retract into the main body to separate from the cabinet of the host when the pull ring is pulled by the lifting component, the main body comprises a first portion and a second portion connected to the first portion, the first portion is configured to fix with the device, the first portion comprises an inner surface for defining a receiving space, the connecting portion is arranged in the receiving space, the second portion is configured to protrude relatively from the device, the second portion forms a ring, the pull ring comprise a ring portion for holding by the lifting component and an extension portion connecting the ring portion for connecting the connecting portion, the ring portion is arranged in the ring formed by the second portion, and an end of the ring portion facing away from the extension portion abuts against the second portion when the pull ring is pulled.

2. The connector of claim 1, further comprising an elastic member, wherein the elastic member is arranged between the connecting portion and the inner surface of the first portion, the elastic member is compressed between the connecting portion and the inner surface of the first portion when the pull ring is pulled to drive the connecting portion to move.

3. The connector of claim 1, wherein the connecting portion comprises an inclined surface, the inclined surface is configured to protrude from the main body or retract into the main body.

4. The connector of claim 1, wherein the main body further comprises a first fixing member, the first portion further comprises a receiving part and a cover, the receiving part comprises the inner surface, the cover is fixed to the receiving part through the first fixing member.

5. The connector of claim 1, wherein the connecting portion comprises a plurality of second fixing members, the first portion defines a plurality of connecting holes, each of the plurality of second fixing members penetrates one of the plurality of connecting holes and is used to be fixed to the device.

6. A host comprising:
a cabinet; and
a connector for installing a device in the cabinet, the connector comprising:
 a main body for connecting the device;
 a connecting portion retractably connected to the main body; and
 a pull ring connected to the connecting portion,
 wherein the pull ring is configured to be connected to a lifting component, the connecting portion is configured to partially protrude from the main body to connect to a cabinet of the host when the pull ring is not pulled by the lifting component, and retract into the main body to separate from the cabinet of the host when the pull ring is pulled by the lifting component, the main body comprises a first portion and a second portion connected to the first portion, the first portion is configured to fix with the device, the first portion comprises an inner surface for defining a receiving space, the connecting portion is arranged in the receiving space, the second portion is configured to protrude relatively from the device, the second portion forms a ring, the pull ring comprise a ring portion for holding by the lifting component and an extension portion connecting the ring portion for connecting the connecting portion, the ring portion is arranged in the ring formed by the second portion, and an end of the ring portion facing away from the extension portion abuts against the second portion when the pull ring is pulled.

7. The host of claim 6, wherein the connector further comprises an elastic member, the elastic member is arranged between the connecting portion and the inner surface of the first portion, the elastic member is compressed between the connecting portion and the inner surface of the first portion when the pull ring is pulled to drive the connecting portion to move.

8. The host of claim 6, wherein the connecting portion comprises an inclined surface, the inclined surface is configured to protrude from the main body or retract into the main body.

9. The host of claim 6, wherein the main body further comprises a first fixing member, the first portion further comprises a receiving part and a cover, the receiving part comprises the inner surface, the cover is fixed to the receiving part through the first fixing member.

10. The host of claim 6, wherein the connecting portion comprises a plurality of second fixing members, the first portion defines a plurality of connecting holes, each of the plurality of second fixing members penetrates one of the plurality of connecting holes and is used to be fixed to the device.

11. A data processing equipment comprising:
a host performing data processing comprising:
 a cabinet; and
 a connector for installing a device in the cabinet, the connector comprising:
  a main body for connecting the device;
  a connecting portion retractably connected to the main body; and
  a pull ring connected to the connecting portion,
  wherein the pull ring is configured to be connected to a lifting component, the connecting portion is configured to partially protrude from the main body to connect to a cabinet of the host when the pull ring is not pulled by the lifting component, and retract into the main body to separate from the cabinet of the host when the pull ring is pulled by the lifting component, the main body comprises a first portion and a second portion connected to the first portion, the first portion is configured to fix with the device, the first portion comprises an inner surface for defining a receiving space, the connecting portion is arranged in the receiving space, the second portion is configured to protrude relatively from the device, the second portion forms a ring, the pull ring comprise a ring portion for holding by the lifting component and an extension portion connecting the ring portion for connecting the connecting portion, the ring portion is arranged in the ring formed by the second portion, and an end of the ring portion facing away from the extension portion abuts against the second portion when the pull ring is pulled.

12. The data processing equipment of claim 11, wherein the connector further comprises an elastic member, the elastic member is arranged between the connecting portion and the inner surface of the first portion, the elastic member is compressed between the connecting portion and the inner surface of the first portion when the pull ring is pulled to drive the connecting portion to move.

13. The data processing equipment of claim 11, wherein the connecting portion comprises an inclined surface, the inclined surface is configured to protrude from the main body or retract into the main body.

14. The data processing equipment of claim 11, wherein the main body further comprises a first fixing member, the first portion further comprises a receiving part and a cover, the receiving part comprises the inner surface, the cover is fixed to the receiving part through the first fixing member.

* * * * *